United States Patent Office 3,065,462
Patented Nov. 20, 1962

3,065,462
SCANNING CONTROL SYSTEM
Frederick L. Maltby, Abington, and Morton Sklaroff, Philadelphia, Pa., assignors to Robertshaw-Fulton Controls Company, Richmond, Va., a corporation of Delaware
Filed Oct. 7, 1958, Ser. No. 765,877
8 Claims. (Cl. 340—213)

This invention relates generally to a scanning control system and more particularly to electrical circuitry and components for monitoring the condition of a plurality of variables.

In certain industrial processes, it is necessary to monitor many controlled variables and the amount by which they deviate from preselected standards. Such monitoring may be readily accomplished by individual control units which continuously compare a quantity, such as a temperature or other variable, to some preset standard and derive therefrom an electrical signal related to the deviation. The electrical signal thus derived can be utilized to correct the deviation or give visual or audible indication of the deviation.

When these controlled variables are widely separated by great distances, it is much more desirable for the individual monitoring units to be located at some more or less central location which is easily accessible to the operator or operators of the process. Some attempts at locating the individual monitoring devices at a central point have resulted in mere duplication of equipment for each of the variables and consequently complexity of circuitry and general bulkiness of the equipment at the central control point, particularly when a large number of variables were being monitored. The present invention contemplates a system which periodically scans a plurality of individual variables to derive error signals therefrom utilizing a substantial amount of common equipment.

Accordingly, an object of this invention is to periodically collate each of a plurality of controlled variables with respective preselected standards corresponding to each of the controlled variables in a common collator to derive error signals in response thereto.

Another object of this invention is to utilize error signals derived from a collator to give visual and audible indication of deviations in any one of a plurality of controlled variables from preselected standards corresponding thereto.

A further object of this invention is to periodically collate each of a plurality of controlled variables with preselected standards corresponding to each of the controlled variables and energize a visual alarm corresponding to any particular controlled variable which has exceeded its respective preselected standard.

A still further object of this invention is a scanning control system of simple and inexpensive construction that is positive in operation.

The present invention utilizes a plurality of ionizable indicating means, each of which respectively corresponds to each of a plurality of variables, the conditions of which are being monitored. The plurality of indicating means are operatively connected to a first source of voltage which is of sufficient magnitude to maintain the indicating means ionized but which is of insufficient magnitude to ionize the indicating means. A second source of voltage of sufficient magnitude to ionize the indicating means is also provided. Relay means are operatively connected to the first and second sources of voltage and are operable between positions for controlling the ionization of the indicating means by a collator which is responsive to the conditions of each of the variables being monitored. Switching apparatus is operable to sequentially connect each of the variables to the collator and the corresponding ionizable indicating means to the relay means whereby each of the indicating means is ionized when the variable corresponding thereto has deviated from a preselected condition.

These and other objects will become apparent from the following description taken in connection with the accompanying drawings wherein.

Figure 1:
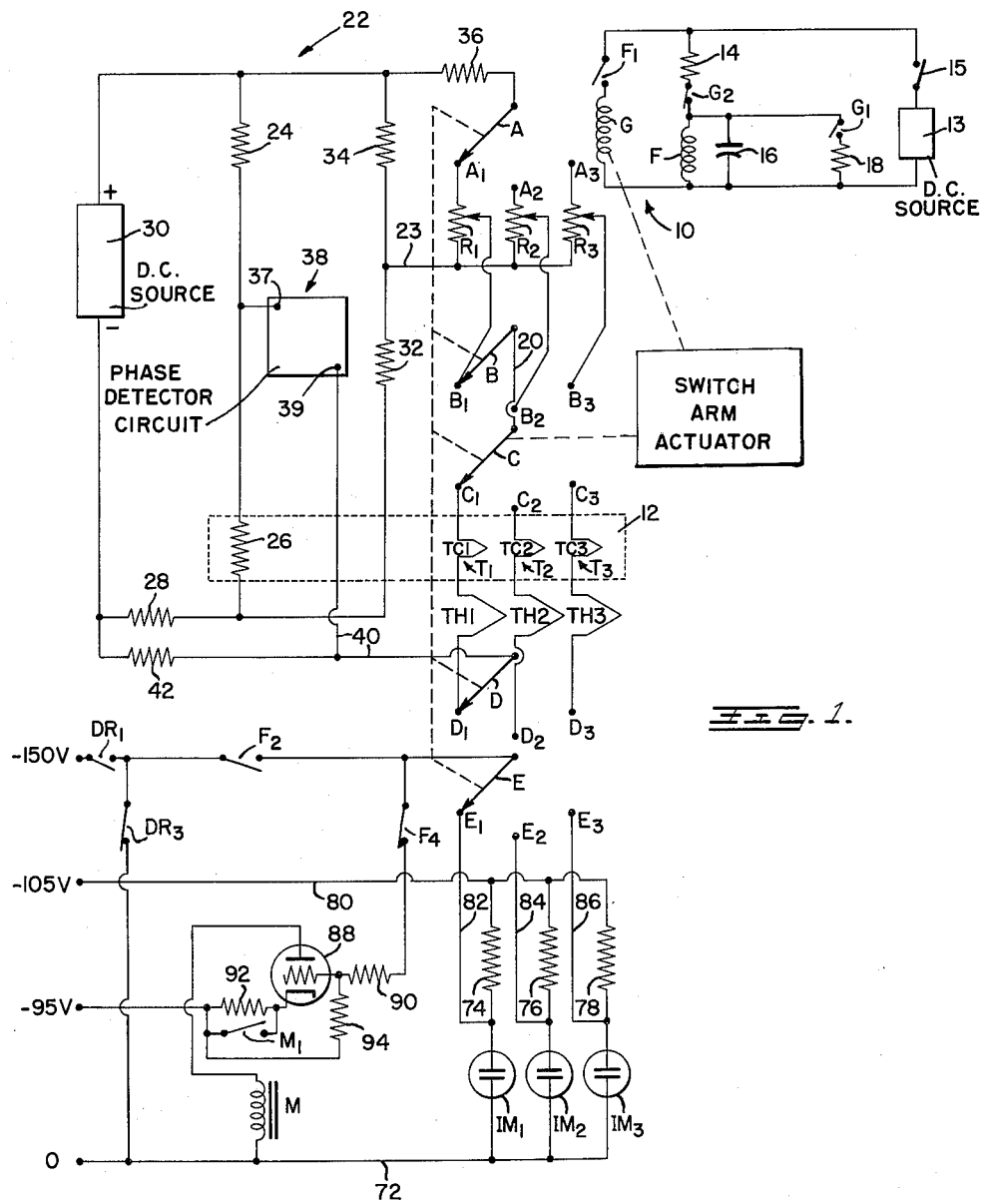
FIG. 1 is an electrical schematic of the scanning control system of this invention shown as used in conjunction with a plurality of temperature detectors.

This invention will be described in conjunction with monitoring the condition of a plurality of variable temperatures which are being measured by a plurality of thermocouple elements T1, T2, T3 as shown in FIG. 1. The hot and cold end junctions of the thermocouple elements T1, T2, T3 are shown at TH1, TH2, TH3 and TC1, TC2, TC3, respectively. Hot end junctions TH1, TH2, TH3 are disposed at the variable temperatures which are being monitored and cold end junctions TC1, TC2, TC3 which may be suitably formed by the connection of each thermocouple lead to a switching apparatus indicated generally at 10 are disposed in a cold end box indicated at 12 and described more fully hereinafter.

Switching apparatus 10 comprises a plurality of movable switch arms A, B, C, D, and E, each of which are cooperable with a plurality of stationary contacts. Switch arms A and B are each shown as being cooperable with three stationary contacts A1, A2, A3 and B1, B2, B3, respectively. Switch arms C, D, and E are also shown as being cooperable with three stationary contacts which are marked in a manner similar to that of the stationary contacts cooperable with switch arms A and B.

Switch arms A, B, C, D, and E are ganged together and are moved or stepped simultaneously so that at any instant of time, they assume the same position relative to their respective stationary contacts. A stepping circuit for actuating switch arms A, B, C, D, and E between positions is shown in the upper right hand corner of FIG. 1 and includes a high resistance current interrupting relay comprising a coil F and normally open contacts F1, F2, F3 (FIG. 4) and a normally closed contact F4; and a stepping relay comprising a coil G and normally open and normally closed contacts G1 and G2, respectively. Coil F is connected across a source of direct current 13 via the series circuit including normally closed contact G2, a resistor 14, and a suitable manually operable switch 15. Coil G and normally open contact F1 are connected in series and in turn connected in parallel with the series connected elements including coil F, normally closed contact G2, and resistor 14. A capacitor 16 is connected in parallel with coil F as is a resistor 18 connected in series with normally open contact G1.

Figure 3:
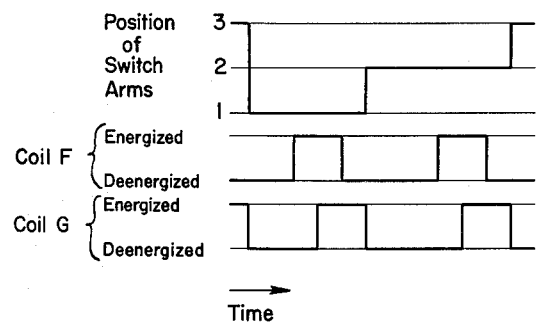
FIG. 3 is a stepping sequence diagram illustrating operation of this invention.

In considering the operation of switching apparatus 10, the circuit of FIG. 1 should be viewed simultaneously with FIG. 3 which shows the positions of switch arms A, B, C, D, and E relative to their respective stationary contacts as a function of time and the energized and de-energized conditions of coils F and G. When switch 15 is actuated to a closed position, capacitor 16 becomes charged from the direct current source 13 through the circuit comprising resistor 14 and normally closed contact G2. When sufficient potential builds up across capacitor 16, coil F will be energized to close contact F1. Closure of contact F1 places coil G across the D.C. source 13 to cause energization thereof and simultaneously therewith, the opening of contact G2 and the closing of contact G1. The switch arm actuator which is a part of the switching apparatus 10 is cocked or placed in a position in response to energization of coil G wherein switch arms A, B, C, D, and E will be advanced or moved to a new position engaging different contacts upon the de-energization of coil G. Coil F, it will be noted, is disconnected from the source of power 13 when contact G2 opens and capacitor 16 is discharged through resistor 18 upon the closure of contact G1. Coil F is, accordingly, de-energized to open contact F1 whereby coil G is de-energized and switch arms A, B, C, D, and E are advanced to engage different contacts.

Assuming that switch arms A, B, C, D, and E were in the position shown in FIG. 1 engaging their respective number 1 contacts when switch 15 was closed and the above described operation ensued, it will be evident from FIG. 3 that de-energization of coil G caused switch arms A, B, C, D, and E to disengage their respective number 1 contacts and engage their respective number 2 contacts. De-energization of coil G, it will be noted, places the stepping circuit into the position shown in FIG. 1 with switch 15 closed. So long as switch 15 remains closed, coils F and G will be automatically and sequentially energized and de-energized to advance switch arms A, B, C, D, and E to a new position each time that coil G becomes de-energized. By appropriate selection of the sizes of capacitor 16 and resistors 14 and 18, the stepping circuit may be arranged so that switch arms A, B, C, D, and E engage each of their respective contacts for as long or as short a period of time as will be suitable to fulfill the functions to be hereinafter described. For purposes of this description, switch arms A, B, C, D, and E may be assumed to engage each of their respective contacts for the duration of ten seconds.

Thermocouple elements T1, T2, T3 are connected intermediate stationary contacts C1, D1, C2, D2, and C3, D3, respectively, as indicated in FIG. 1. Switch arms C and B are connected by a wire 20 and are operative to connect thermocouple elements T1 T2, T3 to a plurality of variable control resistors R1, R2, R3 which respectively correspond thereto. Resistors R1, R2, R3 predetermine the "set point" or temperature condition of the variable to which a collator indicated generally at 22 will be responsive and are each calibrated directly in terms of temperature and provided with slide wires which are movable to set any temperature which is desired. Resistors R1, R2, R3 each have one end thereof connected to a wire 23 and the other ends thereof are connected to stationary contacts A1, A2, A3, respectively, whereas the slide wires of each of the resistors R1, R2, R3 are connected to the stationary contacts B1, B2, B3 respectively.

Switching apparatus 10 is operative to connect thermocouples T1, T2, T3 to their respective control resistors R1, R2, R3 and to the collator 22. The collator 22 of the present invention comprises a potentiometric bridge circuit including two fixed resistance arms 24, 26 connected in series relation with a fixed resistor 28 and a source of D.C. potential 30 which should be of constant value to enhance the accuracy of the bridge circuit. A fixed resistor 32 is connected between the junction of resistors 26, 28 and wire 23. A fixed resistor 34 is connected between the end of resistor 24 connected to D.C. source 30 and wire 23. A series circuit comprising a fixed resistor 36, switch arm A, one of resistors R1, R2 or R3 as determined by the position of switch arm A and wire 23 is connected in parallel with resistor 34. It will be evident that a third leg of the bridge circuit is thus formed by resistor 32, wire 23, and the portion of one of control resistors R1, R2, or R3, as determined by the position of switch arm A, between its slide wire and wire 23. The fourth leg of the bridge circuit comprises a series circuit including the portions of one of resistors R1, R2, or R3, as determined by the position of switch arm A, intermediate its slide wire and the stationary contacts A1, A2, or A3 respectively, the switch arm A and resistor 36. One terminal 37 of a converter and phase sensitive detector circuit, indicated at 38, is connected intermediate the resistors 24 and 26 and another terminal 39 thereof is connected to the slide wires of resistors R1, R2 and R3 through a circuit which may be traced from terminal 39, through a wire 40, switch arm D, thermocouple elements T1, T2 or T3, switch arm C, wire 20, and through switch arm B to the respective slide wires of resistors R1, R2, or R3. To complete the bridge circuit, a resistor 42 is connected intermediate the negative side of source 30 and the wire 40 for a purpose to be hereinafter made apparent.

In the bridge circuit of the present invention, the voltage appearing across the third leg thereof comprising resistor 32 and a portion of resistors R1, R2, or R3 is used as a standard, and is readily varied as a function of the movement of the slide wires on resistors R1, R2, or R3. A variable voltage to be compared to the standard voltage is produced by the thermocouple elements T1, T2, or T3 and appears intermediate the terminal 39 of converter and phase sensitive detector 38 and the slide wires of the resistors R1, R2, or R3.

The bridge of the present invention will be operated generally in an unbalanced condition and the converter and phase sensitive detector 38 will be responsive only to a condition of unbalance in a particular direction in a manner to be hereinafter made apparent. The variable voltage across the thermocouple elements normally opposes the voltage appearing across the third leg of the bridge circuit in an amount to render terminal 39 positive relative to terminal 37. When terminal 39 is positive relative to terminal 37, the temperature as detected by thermocouple elements T1, T2, or T3 is lower than the "set point" as set by the slide wires of corresponding resistors R1, R2 or R3. However, when the temperature produced by thermocouple elements T1, T2, or T3 exceeds the "set point" as set by the slide wires of corresponding resistors R1, R2 or R3, a condition wherein terminal 39 becomes negative relative to terminal 37 will exist and hereinafter this condition will be referred to as an alarm condition.

As is well known in the art, thermocouple elements have the inherent characteristic of producing a voltage which is proportional to the difference in temperature between their respective hot and cold ends. In order to have true indications of the hot end temperatures, the cold ends of thermocouples must be kept at constant temperatures or else some provisions must be made to compensate for temperature variations at the cold ends thereof. In this regard, compensation for variations in cold end temperatures is produced by the resistor 26 which in this invention has a positive temperature coefficient and which is preferably made from nickel.

Considering for the moment the condition of balance in the bridge circuit, it should be apparent that the voltage appearing across resistor 26 will be exactly equal to the voltage appearing across the third leg of the bridge less the voltage appearing across the thermocouple elements T1, T2, or T3 so as to maintain terminals 37 and 39 at the same potential. If at this condition of balance, the temperatures of cold end junctions TC1, TC2, TC3 should vary, a difference of potential will exist between terminals 37 and 39 to indicate a condition of unbalance even though the bridge is in reality balanced. As noted heretofore, cold end junctions TC1, TC2, and TC3 are disposed in cold end box 12 and it should be noted further that the nickel resistor 26 is likewise disposed therein. Accordingly, by maintaining cold end box 12 at any given temperature, cold end junctions TC1, TC2, TC3 as well as nickel resistor 26 will be maintained at this same given temperature. Since the voltage across resistor 26 will increase with an increase in temperature, and the voltage across thermocouple elements T1, T2, T3 will decrease with an increase in temperature of TC1, TC2, and TC3, it will be evident that resistor 26 can be selected to compensate for any conceivable variations in voltage appearing across thermocouple elements T1, T2, T3 due to variations in cold end temperatures at TC1, TC2, TC3.

Figure 2:
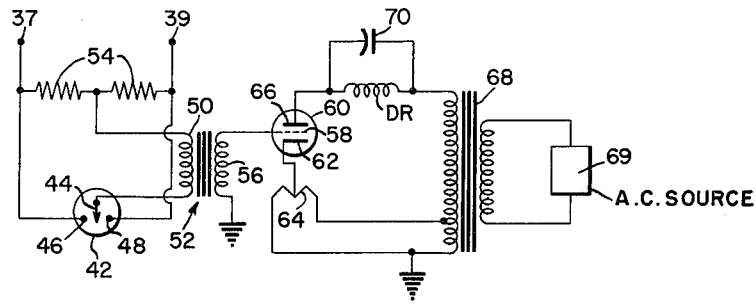
FIG. 2 is an electrical schematic of a converter and detector which may be utilized in the collator of FIG. 1.

One form of the converter and phase sensitive detector 38 is shown in FIG. 2 and comprises a single-pole, double-throw switch 42 having a movable contact arm 44 and a pair of fixed contacts 46, 48 connected to the terminals 37, 39, respectively. Movable arm 44 is connected through a secondary winding 50 of a transformer 52 to the center tap of a resistor 54 which is connected across terminals 37, 39. The primary winding 56 of transformer 52 is connected between ground and a grid 58 of a tube 60 which is operated as a phase sensitive detector and which includes a cathode 62, a center tapped heater 64 and an anode 66. Tube 60 is supplied with electric power by a transformer 68, the primary of which is connected across a suitable source of alternating current potential 69 and the secondary of which is connected between ground and the anode 66. Heater 64 is supplied with operating potential by a connection between ground and a tap on the secondary of transformer 68 and cathode 62 is connected to the center tap of heater 64 to provide a fail-safe operation of tube 60 in the event of grid signal failure. A detector relay having a coil DR and normally open contacts DR1 (FIG. 1) and DR2 (FIG. 4) and a normally closed contact DR3 (FIG. 1) is responsive to the conduction of tube 60 and, in this regard, coil DR is shown serially connected in the anode circuit of tube 60 with capacitor 70 connected thereacross.

Switch 42 is operated as a chopper and to effect this operation, movable arm 44 is continuously actuated between positions of engagement and disengagement with contacts 46, 48 by means (not shown) energized from the source of power 69. It will be apparent to those skilled in the art that switch 42 will apply the D.C. potential appearing between terminals 37, 39 to the secondary winding 50 of transformer 52 in a manner to impress an A.C. potential on the grid 58 of tube 60 and that the frequency of the A.C. potential appearing at grid 58 will correspond to that of the power source 69.

It should be further apparent that when terminal 39 is negative with respect to terminal 37 that the potential appearing at grid 58 will be of one phase and that when terminal 39 is positive with respect to terminal 37 that the potential appearing at grid 58 will be shifted 180° in phase from the phase of the potential of the prior condition. For purposes of this description, the potential at grid 58 will be considered to be 180° out of phase with the voltage appearing at plate 66 when terminal 39 is positive with respect to terminal 37 and tube 60 will be biased to cut off whereas when terminal 39 is negative with respect to terminal 37, the voltage appearing at grid 58 will be in phase with the voltage applied to plate 66 and tube 60 will conduct. Accordingly, coil DR of the detector relay will be energized each time that tube 60 conducts to indicate an alarm condition of any one of the thermocouple elements T1, T2, or T3.

Upon failure of the tube 60, grid 58 will be biased to the voltage appearing at cathode 62 and insufficient current will flow therethrough to energize coil DR of the detector relay. Although the tube 60 is shown directly coupled to the chopper 42, it may be preceded by several stages of amplification as will be apparent to those skilled in the art.

It will be further apparent that upon failure or "burnout" of one of the thermocouple elements T1, T2, or T3 that the negative terminal of source 30 will be connected directly to terminal 39 of converter and phase sensitive detector 38 through the resistor 42. Thus coil DR of the detector relay will be energized to indicate an alarm condition upon thermocouple "burnout" as if a thermocouple element had exceeded its "set point."

The detector relay is operative to actuate a visual alarm circuit which comprises a plurality of suitable indicating means indicated at IM1, IM2 and IM3 and which correspond respectively to the thermocouple elements T1, T2, and T3. Indicating means IM1, IM2, and IM3 may take the form of any suitable high hysteresis device, such as neon bulbs, which have the characteristic of being ionized at a given potential and thereafter being maintained ionized by some potential of a lower magnitude than that of the ionizing potential.

The neon bulbs IM1, IM2, IM3 are connected to a suitable regulated voltage supply which will hereinafter be referred to as the visual alarm circuit supply and which is shown comprising potential taps at 0, −95, −105, and −150 volts. One end of each of the neon bulbs IM1, IM2, IM3 is connected to the zero potential tap by a wire 72 and the other ends thereof are respectively connected to one end of resistors 74, 76, 78. The other ends of resistors 74, 76, 78 are connected by a wire 80 to the −105 volt tap which is of sufficient magnitude to maintain the bulbs ionized once they have been ionized. The junctures intermediate neon bulbs IM1, IM2, IM3 and resistors 74, 76, 78 are connected to stationary contacts E1, E2, and E3, respectively, by wires 82, 84, 86, respectively. A source of ionizing potential which is of sufficient magnitude to ionize the bulbs IM1, IM2, IM3 and which is designated as the −150 volt tap is connected to switch arm E through a circuit comprising normally open contact DR1 of the detector relay connected in series with normally open contact F2 of the current interrupter relay. Normally closed contact DR3 of the detector relay interconnects the wire 72 and the junction intermediate contacts DR1 and F2 for a reason hereinafter apparent.

A memory tube 88 and a memory relay having a coil M and a pair of contacts M1, M2 which are normally open and normally closed respectively are responsive to the ionized condition of the neon bulbs IM1, IM2, and IM3. The grid of tube 88 is connected to switch arm E through a grid resistor 90 and the normally closed contact F4 of the current interrupting relay whereas the plate of tube 88 is connected to the wire 72 through the coil M of the memory relay. The cathode of tube 88 is normally maintained positive with respect to the grid thereof and is shown connected to the −95 volt tap of the visual alarm circuit supply by a cathode resistor 92. The normally open contact M1 of the memory relay is connected across the cathode resistor 92 and a resistor 94 connects the grid of tube 88 to the −95 volt tap of the visual alarm circuit supply.

As is evident from FIG. 1, normally closed contact F4 of the current interrupter relay is operative to connect and disconnect the grid of tube 88 to and from the switch arm E. The switch arm E, in turn, through wires 82, 84, or 86, respectively, connects the grid of tube 88 to the neon bulbs IM1, IM2, or IM3. Assuming switch arm E to be in the position shown in FIG. 1 with neon bulb IM1 de-ionized, it is evident that the grid of tube 88 is connected to the −105 volt tap of the visual alarm circuit supply via resistor 90, normally closed contact F4, switch arm E, switch contact E1, and resistor 74. The grid of tube 88 is thus maintained negative with respect to the cathode of tube 88 and tube 88 will not conduct. However, assuming the same condition as above except with neon bulb IM1 ionized, it will be evident that a voltage drop will appear across resistor 74 and that the grid of tube 88 will no longer be maintained negative with respect to the cathode thereof and tube 88 will conduct to energize coil M of the memory relay. Energization of coil M causes closure of contact M1 which short circuits cathode resistor 92 to maintain tube 88 in the condition of conduction. Tube 88 will thereafter continue to conduct until a biasing potential is applied to the grid of tube 88 as will hereinafter be made apparent.

Figure 4:
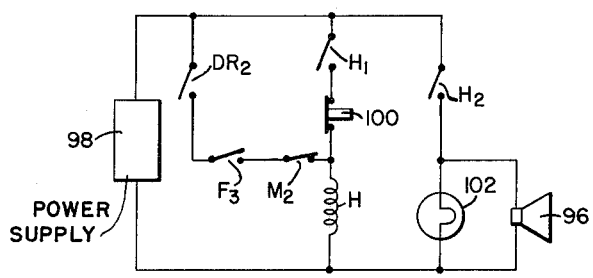
FIG. 4 is an electrical schematic of an audible alarm circuit for use with the scanning control system of FIG. 1.

The audible alarm circuit shown in FIG. 4 is responsive to the condition of the visual alarm circuit just described and is shown comprising a suitable audible alarm device such as a horn 96 energized from a suitable source of electrical potential 98. The audible alarm circuit includes an alarm relay having a coil H and a pair of normally open contacts H1 and H2. Coil H is connected across the source of potential 98 through an energizing circuit comprising normally open contact DR2 of the detector relay, normally open contact F3 of the current interrupter relay and normally closed contact M2 of the memory relay connected in series. A latching or holding circuit for coil H comprises normally open contact H1 connected in series with a manually operable push button 100 which is utilized to acknowledge an alarm condition. Normally open contact H2 disconnects one side of source 98 from horn 96 and a suitable alarm bulb 102 may be connected across the terminals of horn 96.

In operation of the apparatus just described, the hot end junctions TH1, TH2, and TH3 of thermocouple elements T1, T2, and T3, respectively, will be located at the temperature to be monitored as heretofore described. The remainder of the apparatus above described may be conveniently located in a suitable control cabinet (not shown) in some central location from which the monitored variables are being controlled. Visual indicating means IM1, IM2, and IM3 may be suitably arranged on the cover of the control cabinet so that their ionized and/or de-ionized conditions may be observed and may be further identified as to the particular variable that each represents. The horn 96 and indicating light 102 may also be suitably located at the central control point or at some remote point thereto within sight and/or hearing of the operator or operators of the process.

With switch 15 in a closed position as explained heretofore, switching apparatus 10 will momentarily and sequentially connect each of the thermocouple elements T1, T2, T3 and their corresponding control resistors R1, R2, R3 to the collator 22 to scan their condition and simultaneously therewith connect switch arm E to the corresponding indicating means IM1, IM2, IM3. The temperature of each of the thermocouple elements as determined by the voltage appearing thereacross will in collator 22 be collated with the "set point" temperature as predetermined by the slide wire setting of the corresponding control resistor as explained heretofore. Then, depending upon whether the temperature of the thermocouple element is greater than or less than the "set point" temperature as determined by the corresponding control resistor, coil DR of the detector relay will become energized or remain in its de-energized condition.

In describing the operation of the apparatus of this invention, let it first be assumed that the switching apparatus 10 has just connected thermocouple element T1 and corresponding control resistor R1 to collator 22 and that the temperature as detected by thermocouple element T1 does not exceed the "set point" as predetermined by control resistor R1. It is evident that terminal 39 of converter and phase sensitive detector 38 will remain positive with respect to terminal 37 thereof and that coil DR of the detector relay will remain de-energized. Contacts DR1, DR2, DR3 of the detector relay consequently remain in the positions shown in FIGS. 1 and 4 and prevent indicating means IM1 from being connected to the source of ionizing potential and prevent coil H of the alarm relay from being connected to the source of power 98.

It is important at this point to note that subsequent to a switching operation such as when switch arms A, B, C, D, and E are moved to disengage their respective number 3 contacts and engage their respective number 1 contacts, that coil F of the current interrupting relay remain de-energized thereby disconnecting the visual indicating means IM1, IM2, IM3, the memory tube 88 and coil M of the memory relay from the source of ionizing potential; and the audible alarm relay coil H from the source of potential 98. It is essential that these circuits be disconnected from their respective sources of potential subsequent to a switching operation so that any switching transients which may occur will be isolated from these circuits to prevent erroneous energization of the components in these circuits.

Subsequently, when switching transients have settled, which duration of time is conveniently measured by the length of time required to charge condenser 16, coil F of the current interrupter relay becomes energized to close the normally open contacts F2 (FIG. 1) and F3 (FIG. 4) and open the normally closed contact F4 (FIG. 1). The opening of contact F4 opens the circuit between the grid of memory tube 88 and switch arm E. Closure of contact F3 has no affect upon coil H of the alarm relay in that contact DR2 of the detector relay remains in an open position. Closure of contact F2, however, connects normally closed contact DR3 across neon bulb IM1 to short circuit the neon bulb through a circuit which may be traced from normally closed contact DR3 through contact F2, switch arm E, stationary contact E1, wire 82, neon bulb IM1, and through wire 72 to normally closed contact DR3. Neon bulb IM1 is thus maintained de-ionized which is the proper indication when thermocouple element T1 is not in an alarm condition.

During this duration of time, it will be evident from FIG. 3 coil G of the stepping relay has become energized and subsequent to its energization causes the de-energization of coil F of the current interrupter relay which in turn causes the subsequent de-energization of coil G of the stepping relay. Switch arms A, B, C, D, and E accordingly disengage their respective number 1 contacts and engage their respective number 2 contacts.

Assuming now that switch arms A, B, C, D, and E engage their respective number 2 contacts connecting thermocouple element T2 and corresponding resistor R2 to collator 22, that thermocouple element T2 is in an alarm condition. The alarm condition of thermocouple element T2 causes terminal 39 of converter and phase sensitive detector 38 to become negative with respect to terminal 37 thereof and, as explained heretofore, coil DR of the detector relay is energized to close normally open contacts DR1, DR2 and open normally closed contact DR3.

When coil F of the current interrupting relay becomes energized, contacts F2 (FIG. 1) and F3 (FIG. 4) thereof are actuated to a closed position and contact F4 (FIG. 1) is actuated to an open position. Upon closure of contact F2 of the current interrupting relay with contact DR1 of the detector relay already in a closed position, it will be evident that neon bulb IM2 will be ionized. Neon bulb IM2 is ionized through a circuit which may be traced from the —150 volt tap of the visual alarm circuit supply through contact DR1, contact F2, switch arm E, stationary contact E2, wire 84, neon bulb IM2 and wire 72 to the zero potential tap of the visual alarm circuit supply. Simultaneously with the ionization of neon bulb IM2, coil H of the alarm relay is energized through its energizing circuit traced from one side of source 98 through contact DR2, contact F3, normally closed contact M2, and through coil H to the other side of source 98. Normally open contacts H1 and H2 are actuated to a closed position, thereby connecting horn 96 and indicating means 102 across the source of supply 98 and connecting coil H across the source of supply 98 through the manually operable acknowledge button 100.

Energization of horn 96 will make the operator cognizant of the fact that one of the variable temperatures being monitored is in an alarm condition and his attention will be directed to the visual indicating means IM1, IM2, and IM3. Upon observing that neon bulb IM2 is ionized, the operator may proceed to rectify the alarm condition and at the same time manually depress push button 100 to acknowledge the alarm condition. By depressing push button 100, the holding circuit for coil H of the alarm relay is broken to de-energize coil H and thereby de-energize horn 96.

Switching apparatus 10 continues to be connected to the D.C. source 13 and thus it continues to scan the condition of the other thermocouple elements. Assuming now that the condition of thermocouple elements T3 and T1 have been scanned and that switching apparatus 10 re-engages thermocouple element T2 and resistor R2 to find that thermocouple element T2 is still in an alarm condition, it will be evident that terminal 39 of converter and phase sensitive detector will again be made negative with respect to terminal 37 thereof and that coil DR of the detector relay will be energized to close normally open contacts DR1, DR2 and open normally closed contact DR3. Simultaneously therewith, the grid of tube 88 is connected to the junction between resistor 76 and indicating means IM2 through normally closed contact F4 and switch arm E. With no bias appearing at tube 88, it will conduct to energize coil M of the alarm relay closing contact M1 and opening contact M2. Contact M1 shorts out cathode resistor 92 to maintain tube 88 in a condition of conduction and the opening of contact M2 disconnects coil H of the alarm relay from the source of supply 98.

Subsequently, when coil F or the current interrupter relay is energized to close contacts F2, F3 (FIG. 4) and open contact F4, tube 88 will continue to conduct even though indicating means IM2 indicates an alarm condition and horn 96 will remain de-energized. The operator, accordingly, will not be required to acknowledge an alarm condition to silence horn 96 each time that switching apparatus 10 connects a thermocouple element in an alarm condition to collator 22 so long as he has once acknowledged that this particular thermocouple element is in an alarm condition.

However, if when switching apparatus 10 connects thermocouple element T2 and resistor R2 to collator 22 and the alarm condition of thermocouple element T2 has been rectified, it will be evident that coil DR of the detector relay will not be energized. Tube 88 will conduct energizing coil M of the memory relay to open contact M2 in the audible alarm circuit and close contact M1 to maintain tube 88 in a condition of conduction. Subsequently, when coil F of the current interrupting relay becomes energized, contact F2 will close to connect normally closed contact DR 3 across indicating means IM2 thereby short circuiting and de-ionizing the same to indicate that the temperature at thermocouple element T2 has receded to a normal value.

In view of the foregoing, it is apparent that the scanning control system described materially reduces the number of components required to monitor a large number of variables from a central control point by utilizing a number of common components. The system as described lends itself to monitoring the condition of any variables, such as a pressure or a flow, which may be readily converted to a variance in direct current to be utilized in the collator of the present invention.

The number of variables that can be monitored can also be greatly increased from the three temperatures described, and it should be apparent that only the physical size of the apparatus should be a limiting factor.

While only one embodiment of the invention has been shown and described herein, it will be apparent to those skilled in the art that the construction and arrangement of parts in the present invention may be variously embodied or changed without departing from the scope of the invention as defined in the appended claims.

We claim:

1. In an alarm circuit for sequentially monitoring a plurality of condition sensing devices, the combination comprising a plurality of condition sensing devices; a plurality of ionizable indicating means, each corresponding to a separate one of said sensing devices; first means for ionizing said indicating means; second means applied to said plurality of indicating means to maintain said plurality of indicating means ionized; control means having a first and second control circuit, said first control circuit terminating any ionization of the indicating means corresponding to the sensing device being monitored and said second control circuit applying said first means to the indicating means corresponding to the sensing device being monitored; a collator operatively connected to said control means to place one of said first and second control circuits in circuit in response to the condition of the sensing device being monitored; and switching apparatus connected for continuous operation to sequentially connect each of said sensing devices to said collator and simultaneously therewith to connect said corresponding indicating means to said control means.

2. In an alarm circuit for sequentially monitoring a plurality of condition sensing devices, the combination comprising a plurality of condition sensing devices; a plurality of ionizable means, each corresponding to a separate one of said sensing devices; a first source of voltage for ionizing said indicating means; a second source of voltage applied to said plurality of indicating means and of insufficient magnitude to ionize said indicating means, but of sufficient magnitude to maintain said indicating means ionized; control means having a first and a second control circuit, said first control circuit terminating any ionization of the indicating means corresponding to the sensing device being monitored and said second control circuit applying said first source of voltage to the indicating means corresponding to the sensing device being monitored; a collator operatively connected to said control means to place one of said first and second control circuits in circuit in response to the condition sensing device being monitored; and switching apparatus connected for continuous operation to sequentially connect each of said sensing devices to said collator and simultaneously therewith to connect said corresponding indicating means to said control means.

3. In an alarm circuit for sequentially monitoring a plurality of condition sensing devices, the combination comprising a plurality of condition sensing devices; the plurality of parallel connected neon bulbs, each corresponding to a separate one of said sensing devices; a first source of voltage for ionizing said bulbs; a second source of voltage applied to said plurality of said bulbs and of insufficient magnitude to ionize said bulbs, but of sufficient magnitude to maintain said plurality of bulbs ionized; control means having a first and second control circuit, said first control circuit terminating the ionization of the bulb corresponding to the sensing device being monitored and said second control circuit applying said first source of voltage to the bulb corresponding to the sensing device being monitored; a collator operatively connected to said control means to place one of said first and second control circuits in circuit in respnse to the condition sensing device being monitored; and switching apparatus connected for continuous operation to sequentially connect each of said sensing devices momentarily to said collator and simultaneously therewith to connect said corresponding bulb to said control means.

4. In an alarm circuit for monitoring the condition of a plurality of condition sensing devices, the combination comprising a plurality of condition sensing devices; a plurality of parallel connected neon bulbs each corresponding to a separate one of said sensing devices; a first source of voltage for ionizing said neon bulbs; a second source of voltage applied to said plurality of bulbs and of insufficient magnitude to ionize said bulbs, but of sufficient magnitude to maintain said bulbs ionized; relay means operatively connected to said first and second sources of voltage and operable between a first position for connecting the bulb corresponding to the sensing device being monitored to said first source of voltage and in a second position for short circuiting the neon bulb corresponding to the sensing device being monitored;

means operatively connected to said relay means and responsive to the condition of the sensing device being monitored for operating said relay means from the second position to the first position when the sensing device being monitored varies from a predetermined condition; and a continuously operating switching means operable to sequentially connect each of said sensing devices to said collator and simultaneously therewith to connect said corresponding bulb to said relay means.

5. In an alarm circuit for sequentially monitoring a plurality of condition sensing devices, the combination comprising a plurality of condition sensing devices providing an electrical quantity in response to the condition being sensed; a plurality of parallel connected neon bulbs, each corresponding to a separate one of said sensing devices; a first source of voltage for ionizing said bulbs; a second source of voltage applied to said plurality of bulbs and of insufficient magnitude to ionize said bulbs, but of sufficient magnitude to maintain said bulbs ionized; relay means operatively connected to said first source of voltage and operable between a first position for connecting the bulb corresponding to the sensing device being monitored to said first source of voltage and a second position for short circuiting the bulb corresponding to the sensing device being monitored; a plurality of controllers each corresponding to a separate one of said plurality of condition sensing devices, each of said controllers having means for adjusting said controller; a bridge circuit; a source of voltage connected to said bridge circuit; a switching apparatus connected for continuous operation to sequentially connect each condition sensing device and the corresponding one of said controllers to said bridge circuit and the corresponding one of said bulbs to said relay means; and means operatively connected to said relay means and responsive to the unbalanced condition of said bridge circuit for actuating said relay means between said first and second positions, said bridge circuit being in a condition of unbalance determined by the electrical quantity produced by the condition sensing device connected to the bridge circuit and the adjustment of the respective controller connected thereto.

6. In an alarm circuit for sequentially monitoring temperature at a plurality of locations, the combination comprising a plurality of thermocouple devices, each providing a voltage in response to temperature at the device; a plurality of parallel connected neon bulbs, each corresponding to a separate one of said thermocouple devices; a first source of voltage for ionizing said bulbs; a second source of voltage applied to said plurality of bulbs and of insufficient magnitude to ionize said bulbs, but of sufficient magnitude to maintain said bulbs ionized; relay means operatively connected to said first source of voltage and operable between a first position for connecting the bulb corresponding to the thermocouple device being monitored to said first source of voltage and a second position for short circuiting the bulb corresponding to the thermocouple device being monitored; a plurality of controllers, each corresponding to a separate one of said plurality of thermocouple devices, each of said controllers having means for adjusting said controller; a bridge circuit; a source of voltage connected to said bridge circuit; a switching device connected for continuous operation to sequentially connect each thermocouple device and the corresponding one of said controllers to said bridge circuit and the corresponding one of said bulbs to said relay means; and means operatively connected to said relay means and responsive to the unbalanced condition of said bridge circuit for actuating said relay means between said first and second positions, said bridge circuit being in a condition of unbalance determined by the voltage produced by the thermocouple device and the adjustment of the corresponding controller.

7. In an alarm circuit for sequentially monitoring a plurality of condition sensing devices, the combination comprising a plurality of condition sensing devices; a plurality of ionizable indicating means each corresponding to a separate one of said sensing devices; first means for ionizing said indicating means; second means applied to said plurality of indicating means to maintain said plurality of indicating means ionized; control means having a first and a second control circuit, said first control circuit terminating ionization of the indicating means corresponding to the sensing device being monitored and second control circuit applying said first means to the indicating means corresponding to the sensing device being monitored; a collator operatively connected to said control means to place one of said first and second control circuits in circuit in response to the condition of the sensing device being monitored; and switching apparatus connected for continuous operation to sequentially connect each of said sensing devices momentarily to said collator and simultaneously therewith to connect said corresponding indicating means to said control means; an audible alarm; means for actuating said audible alarm; memory means connected via said switching apparatus to the indicating means corresponding to the sensing device being monitored and actuated in response to the ionized condition of said connected indicating means, said memory means being operatively connected to said alarm actuating means to prevent said alarm actuating means from actuating said alarm when said memory means is actuated.

8. In an alarm circuit for sequentially monitoring a plurality of condition sensing devices, the combination comprising a plurality of condition sensing devices; a plurality of parallel connected neon bulbs, each corresponding to a separate one of said sensing devices; first source of voltage for ionizing said bulbs; second source of voltage applied to said plurality of bulbs and of insufficient magnitude to ionize said bulbs, but of sufficient magnitude to maintain said plurality of bulbs ionized; control means having a first and a second control circuit, said first control circuit terminating ionization of the bulb corresponding to the sensing device being monitored and second control circuit applying said first source of voltage to the bulb corresponding to the sensing device being monitored; a collator operatively connected to said control means to place one of said first and second control circuits in circuit in response to the condition of the sensing device being monitored; and switching apparatus connected for continuous operation to sequentially connect each of said sensing devices momentarily to said collator and simultaneously therewith to connect said corresponding bulb to said control means; an audible alarm; means for actuating said audible alarm; memory means connected via said switching apparatus to the bulb corresponding to the sensing device being monitored and actuated in response to the ionized condition of said connected bulb, said memory means being operatively connected to said alarm actuating means to prevent said alarm actuating means from actuating said alarm when said memory means is actuated.

References Cited in the file of this patent

UNITED STATES PATENTS

| | | |
|---|---|---|
| 2,407,361 | Wilson | Sept. 10, 1946 |
| 2,564,294 | Belcher | Aug. 14, 1951 |
| 2,578,447 | Odell et al. | Dec. 11, 1951 |
| 2,696,604 | Markow et al. | Dec. 7, 1954 |
| 2,709,042 | Couffignal | May 24, 1955 |
| 2,731,627 | Herbst | Jan. 17, 1956 |